United States Patent [19]

Pawate et al.

[11] Patent Number: 5,638,530
[45] Date of Patent: Jun. 10, 1997

[54] DIRECT MEMORY ACCESS SCHEME USING MEMORY WITH AN INTEGRATED PROCESSOR HAVING COMMUNICATION WITH EXTERNAL DEVICES

[75] Inventors: Basavaraj I. Pawate, Dallas; Gene A. Frantz, Missouri City; Rajan Chirayil, The Meadows, all of Tex.

[73] Assignee: Texas Instruments Incorporated, Dallas, Tex.

[21] Appl. No.: 49,909

[22] Filed: Apr. 20, 1993

[51] Int. Cl.⁶ .................... G06F 12/00; G06F 13/28
[52] U.S. Cl. ............... 395/442; 395/833; 395/894; 395/282; 395/200.07
[58] Field of Search ............... 364/200 MS File, 364/900 MS File; 395/425, 325, 275, 725, 200, 282, 882, 883, 884, 833, 894, 842, 442, 200.07

[56] References Cited

U.S. PATENT DOCUMENTS

| | | | |
|---|---|---|---|
| 3,648,252 | 3/1972 | Thron et al. | 340/172.5 |
| 3,970,997 | 7/1976 | Daly et al. | 340/172.5 |
| 4,296,466 | 10/1981 | Guyer et al. | 364/200 |
| 4,313,162 | 1/1982 | Baun et al. | 364/200 |
| 4,722,051 | 1/1988 | Chattopadhya | 364/200 |
| 4,722,070 | 1/1988 | Dye | 364/900 |
| 4,841,133 | 6/1989 | Gercekci et al. | 235/492 |
| 4,888,773 | 12/1989 | Arlington et al. | 371/40.2 |
| 4,905,141 | 2/1990 | Fitch et al. | 395/282 |
| 4,968,873 | 11/1990 | Dethloff et al. | 235/380 |
| 4,987,529 | 1/1991 | Craft et al. | 364/200 |
| 5,025,412 | 6/1991 | Dalrymple | 395/883 |
| 5,038,025 | 8/1991 | Kodera | 235/492 |
| 5,077,664 | 12/1991 | Taniai et al. | 395/425 |
| 5,097,437 | 3/1992 | Larson | 395/775 |
| 5,125,095 | 6/1992 | Nakazawa et al. | 395/800 |
| 5,164,985 | 11/1992 | Nysen et al. | 380/9 |
| 5,191,657 | 3/1993 | Ludwig et al. | 395/325 |
| 5,204,663 | 4/1993 | Lee | 340/825.34 |
| 5,218,680 | 6/1993 | Farrell et al. | 395/325 |
| 5,241,161 | 8/1993 | Zuta | 235/382 |
| 5,255,371 | 10/1993 | Latimer et al. | 395/325 |
| 5,283,883 | 2/1994 | Mishler | 395/425 |
| 5,291,614 | 3/1994 | Baker et al. | 395/800 |
| 5,295,255 | 3/1994 | Malecek et al. | 395/425 |
| 5,319,751 | 6/1994 | Garney | 395/650 |
| 5,319,789 | 6/1994 | Ehlia et al. | 395/800 |
| 5,321,819 | 6/1994 | Szczepanek | 395/325 |
| 5,333,293 | 7/1994 | Bonella | 395/425 |
| 5,349,685 | 9/1994 | Houlberg | 395/800 |
| 5,379,382 | 1/1995 | Work et al. | 395/883 |
| 5,404,450 | 4/1995 | Szczepanek et al. | 395/200 |
| 5,412,798 | 5/1995 | Garney | 395/500 |

OTHER PUBLICATIONS

Gram-Reefer, Bill, *AT&T to License PCMCIA Technology From Dr. Neuhaus*, Business Wire (San Francisco, CA, US) s1, p1, Jun. 23, 1992.

Mano, Computer System Architecture, 2nd Edition, pp. 403–473, 1982.

Chips: Fujitsu in production with memory card controller IC; circuit offers single-chip solution, EDGE: Work-Group Computing Report, vol. 2, No. 71, p. 34(1). Sep. 30, 1991.

Belusevic et al., An 80 Mbytes/s data transfer and processing system, Nuclear Instruments & Methods in Physics Research, Section A, vol. A295, No. 3, pp. 391–399. Nov. 1, 1990.

Child, Dual-port designs help memory boards keep pace, Computer Design, vol. 29, No. 21, p. 131(6). Nov. 1, 1990.

Dual-ported bus structure with asynchronous DMA handshake, IBM Technical Disclosure Bulletin, vol. 28, No. 11, pp. 4782–4785. Apr. 1986.

*Primary Examiner*—Matthew M. Kim
*Attorney, Agent, or Firm*—W. Daniel Swayze, Jr.; W. James Brady, III; Richard L. Donaldson

[57] ABSTRACT

A method and system are provided for improved processing between a host computer (200) and process logic (170). Data instructions are stored at multiple memory locations of a memory (150). The data are processed in response to instructions by the process logic (170), which is integrated with the memory (150) within a single integrated circuit. The memory locations are directly accessible without bus arbitration by the external device coupled to the single integrated circuit through an external interface (180), which controls the processing speed of the process logic (170).

4 Claims, 4 Drawing Sheets

DIRECT MEMORY ACCESS SCHEME USING MEMORY WITH AN INTEGRATED PROCESSOR HAVING COMMUNICATION WITH EXTERNAL DEVICES

CROSS-REFERENCES TO RELATED APPLICATIONS

This patent application is related to co-pending U.S. patent application Ser. No. 08/324,291, which is a continuation of the U.S. patent application Ser. No. 07/934,955 entitled "Method and Apparatus for Improved Method Processing"0 by Pawate, et al., filed Aug. 25, 1992, now abandoned; and to co-pending U.S. patent application Ser. No. 07/934,982 entitled "Method and Apparatus for Improved Graphics/Image Processing" by Pawate, et al., filed Aug. 25, 1992; and to co-pending U.S. patent application Ser. No. 07/984,040 entitled "System and Method for Improved Processing" by Pawate, filed Dec. 1, 1992; and to U.S. patent application Ser. No. 08/049,882 entitled "System Design Using Memory With a Host Processor for Activating a Co-Processor", by Pawate, et al., filed Apr. 20, 1993. These applications are herein incorporated by reference in their entirety.

TECHNICAL FIELD OF THE INVENTION

This invention relates in general to processing systems and, in particular, to a method and system for improved processing by providing communication with a host computer.

BACKGROUND OF THE INVENTION

Processing technology has achieved significant increases in processing speed, yet, nevertheless for speech processing, signal processing and image processing systems involving numerous accesses to non-integrated memory devices, the gain in processing speed has been largely offset by relatively slow access times to non-integrated memory devices.

This problem of slow access times is further aggravated by the direction of conventional memory technology toward increasing memory device density. With increased memory device density, the maximum bandwidth of a system decreases because the multiple bus architecture are less practical. For example, in order to store a 480×240, 16-bit image, a graphics application having two 1-megabyte devices achieves one-quarter of the bandwidth then a graphics application having eight 256-kilobyte memory devices.

In accordance with the technique for adjusting the shortcomings, overall system throughput is increased by off-loading time-intensive tasks from a host processor to an Application-Specific Integrated Circuit (ASIC). Nevertheless, one ASIC is used for each function to be off-loaded and memory is dedicated for each ASIC. Accordingly, a higher overall system cost results. Moreover, the system throughput is increased only for a specific task to which the ASIC is directed rather than for tasks in general. Further, the memory dedicated to the ASIC is usually not accessible by the host processor even if the attached ASIC is idle, and well-developed software is needed for "seamless integration". In another technique, a co-processor off-loads tasks from a host processor, and system memory is shared between the host processor and the co-processor. Nevertheless, the total system bandwidth is decreased by arbitration between the host processor and the co-processor. Further, well-developed software is required to comprehensively achieve "seamless" integration of the co-processor. In response to the practical limits on the execution speed of a single processor, other techniques have attempted to increase throughput by partitioning and parallel processing with multiple processors. Nevertheless, such multiprocessing systems have been limited by difficulties in designing software support routines and in developing communication protocols. Thus, a need has arisen for a method and system for improved processing, in which existing systems are readily upgraded by externally interfacing to a memory device. Further, a need has arisen for a method and system for improving processing which the memory device is externally interfaced as a standard memory device. Also, a need has arisen for a method and system for improved processing, in which parallel processing can be more readily achieved such that system throughput is increased.

OBJECTS OF THE INVENTION

It is an object of the invention to achieve addressability as a memory or a Personal Computer Memory Card International Association (PCMCIA) memory or I/O device by the host Personal Computer (PC) or host computer.

It is a further object of the invention to provide a separate attribute memory configurable by a Digital Signal Processor (DSP).

It is a further object of the invention to achieve host computer control of DSP operating speeds for power management, more particularly to save power.

It is a further object of the invention to provide a zero wait state DSP memory.

It is a further object of the invention to achieve page control of the DSP memory to increase DSP address space.

It is a further object of the invention to provide on-board logic to arbitrate the memory bus between the DSP and the host computer.

It is a further object of the invention to provide a smart mode operation for the host computer to control the DSP directly.

It is a further object of the invention to provide direct host computer control of the active DSP task and memory pages.

It is a further object of the invention to provide a dedicated memory for real-time DSP operating systems.

It is a further object of the invention to provide serial and parallel Interface (I/F) to Analog Front-End (AFE) boards.

It is a further object of the invention to provide at least four general purpose DSP inputs and outputs.

It is a further object of the invention to provide direct interrupt control and handshake protocol between the host computer and DSP.

It is a further object to provide a host computer interrupt from AFE cards to monitor external events.

SUMMARY OF THE INVENTION

In a method and system for improved processing, data and instructions are stored at multiple memory locations of the memory. The data are processed in response to the instructions by process logic integrated with the memory within a single integrated circuit. The memory locations are directly accessible by an external device coupled to the single integrated circuit through an external interface.

It is a technical advantage of the present invention that existing systems are readily upgraded by externally interfacing to a memory device having an integrated process logic.

It is another technical advantage of the present invention that integrated process logic is externally interfaced as a standard memory device.

It is a further technical advantage of the present invention that parallel processing can be more readily achieved such that system throughput is increased.

It is a further advantage of the present invention to provide addressability to the memory, the PCMCIA memory or the I/O device by the host computer.

It is a further technical advantage to provide a separate attribute memory configurable by the DSP.

It is a further technical advantage of the present invention to provide host computer control of the DSP operating speeds for power management, allowing various types of DSPs to be used and power to be saved.

It is a technical advantage of the present invention to provide a zero wait state DSP memory.

It is a further technical advantage to provide page control of the DSP memory to increase the DSP address space.

It is a further technical advantage of the invention to provide on-board logic to arbitrate the memory bus between the DSP and the host computer.

It is a further technical advantage of the invention to provide a smart mode operation for the host computer to directly control the DSP.

It is a further technical advantage of the invention to provide direct host computer control of the active DSP tasks and memory pages.

It is a further advantage of the invention to provide a dedicated memory for real-time DSP operating systems.

It is a further technical advantage of the invention to provide serial and parallel interface to AFE boards.

It is a further technical advantage of the invention to provide at least four general purpose DSP inputs and outputs.

It is a further technical advantage to provide direct interrupt control and handshake protocol between the host computer and DSP.

It is a further technical advantage of the invention to provide host computer interrupt from the AFE cards to monitor external events.

These and other features of the invention that will be apparent to those skilled in the art from the following detailed description of the invention, taken together with the accompanying drawings.

DETAILED DESCRIPTION OF THE INVENTION

The present invention and its advantages are understood by refining to FIGS. 1–6 of the drawings, like numerals being used for like corresponding parts of the various drawings.

Figure 1:
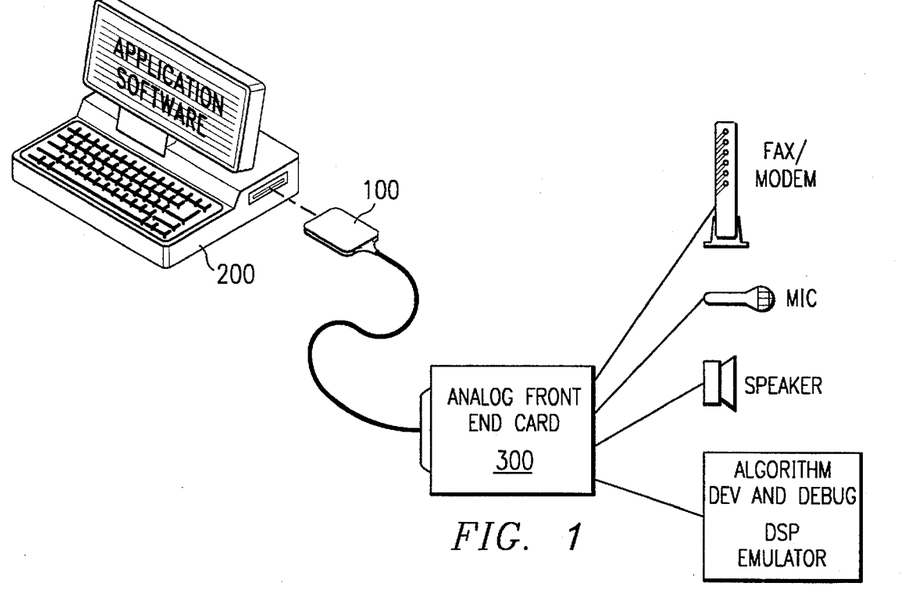
FIG. 1 illustrates a "smart board" of the present invention used with a host computer device and various analog input devices through an Analog Front-End (AFE) card.
Figure 3:
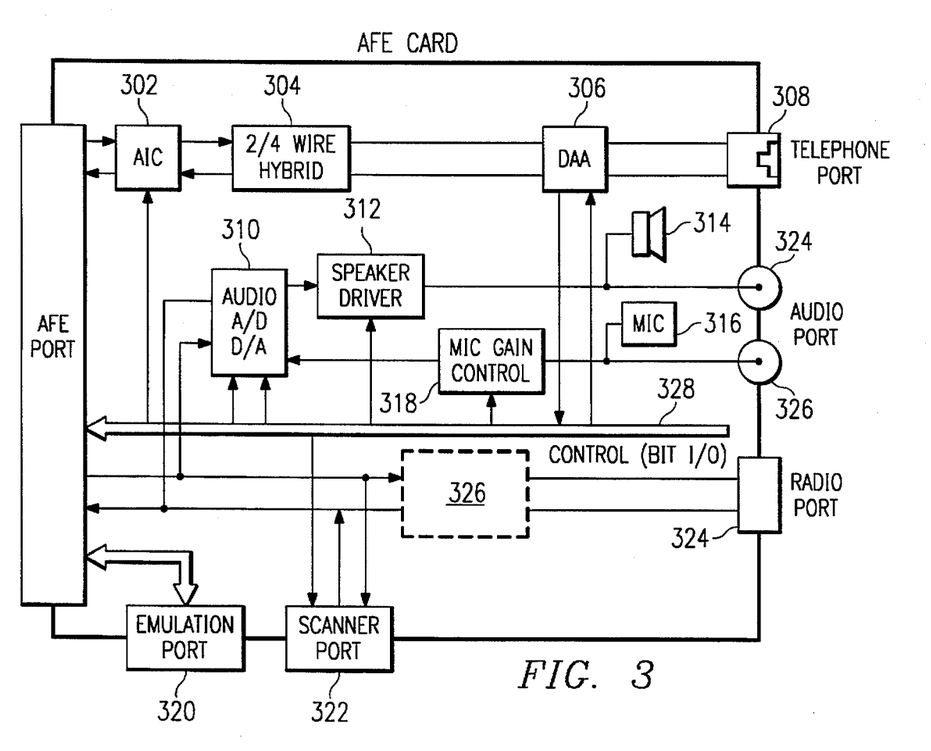
FIG. 3 shows a circuit diagram of an AFE card which could be coupled to the present invention.

FIG. 1 illustrates an application of the present invention. An AFE card (300) is coupled to various devices, for example, a fax/modem, a microphone, a speaker or another device including, for example, a development and debugging emulator. The AFE card (300) is coupled to the smart card (100) of the present invention. The smart card (100) is coupled to application software through a host computer (200), for example, a personal computer. The AFE card (300) provides, for example, a separate 68-pin connector, to be coupled with the DSP to interface to the AFE card. The AFE connector is coupled with the DSP serial port as well as with DSP parallel I/O ports (for example, 8 parallel I/O ports), for the transfer of signals. For example, four programmable bit outputs and four bit inputs are available through this connector to monitor, configure and control external analog-to-digital (AfD) converters and digital-to-analog (D/A) converters and other peripherals. The AFE connector also includes a DSP emulation control connection, for example, through pins to provide DSP algorithm development of the DSP through the AFE card. As illustrated in FIG. 3, the AFE card includes an AIC circuit (302), a 2/4 wire hybrid circuit (304) and a Data Access Arrangement (DAA) circuit (306) coupled to telephone port (308). The audio analog-to-digital and digital-to-analog converters (310) are coupled to the speaker driver circuit (312) and the microphone gain circuit (318). The speaker driver circuit (312) is coupled to speaker (314) which is in turn coupled to an audio port (324). The microphone gain control circuit (318) is coupled to microphone (316), which is coupled to a second audio port (326). The control bus (328) is coupled to the audio analog-to-digital and digital-to-analog circuits (310), the speaker driver circuit (312), the microphone gang control circuit (318) and the DAA circuit (306). Additionally, the control bus (328) is coupled to the scanner port (322). The emulation port (320), the scanner port (322) and the radio port (324) is coupled to the AFE port.

Figure 2:
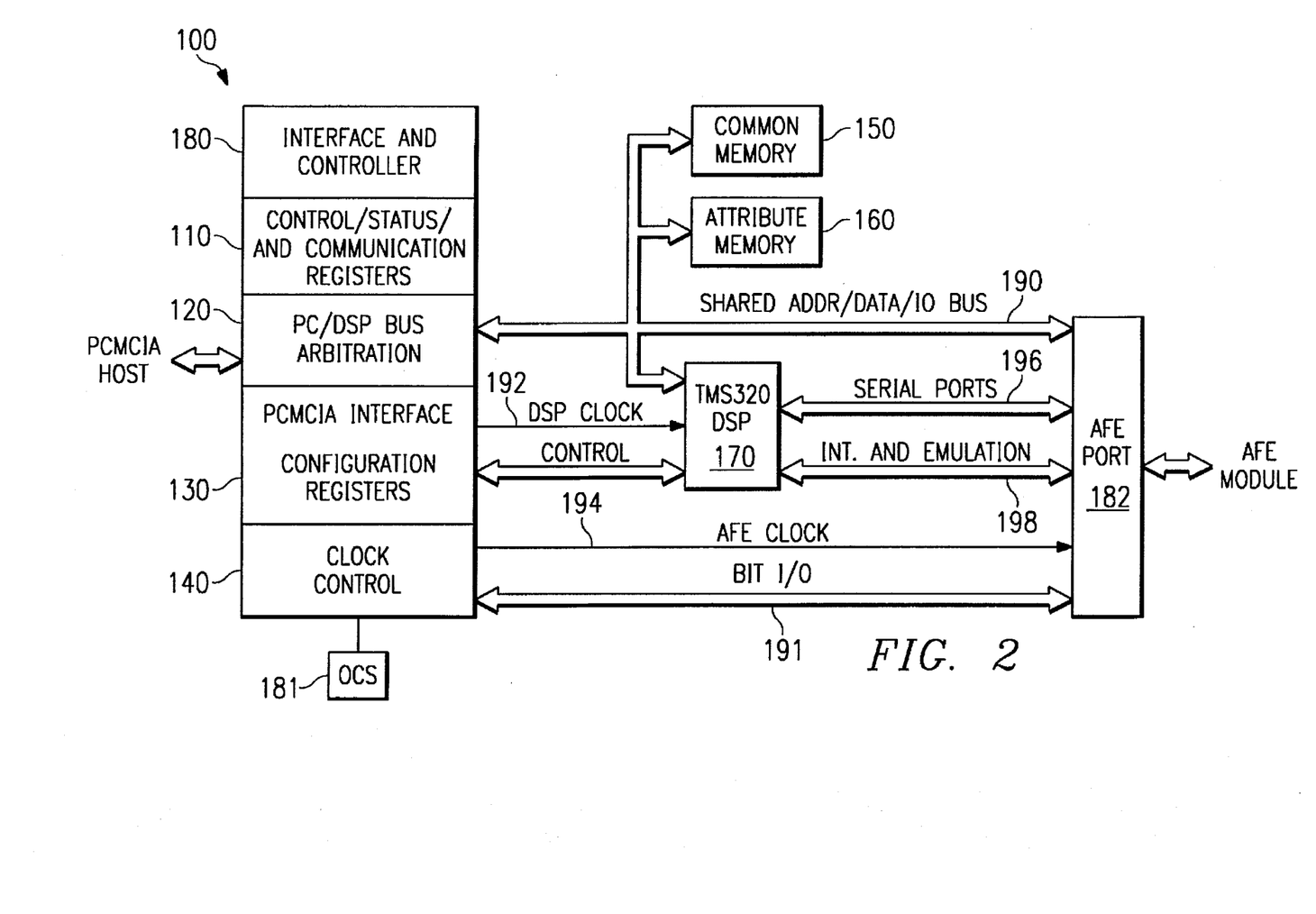
FIG. 2 illustrates a circuit diagram of the present invention connected to a AFE port.

As illustrated in FIG. 2, the AFE module is coupled to the smart card (100) through the AFE port (182). The smart card includes a DSP (170), for example, TMS320. Although the present invention has been explained in terms of the DSP, a process logic or a co-processor could be used in place of the DSP. The DSP (170) is coupled through serial ports (196) to the AFE port (182) and through the Interpret Pin (INT) and emulation ports (198) to the AFE port (182). The DSP (170) is coupled to the shared address/data I/O bus (190) to the common memory (150) and the attribute memory (160). The DSP (170) is coupled through the shared address/data/I/O bus (190) to the interface and controller circuit (180), which is in turn connected to the host computer (200), for example, a PCMCIA host computer. The interface and controller circuit (180) includes communication/status/communication registers (110). The interface and controller circuit (180) includes PC/DSP bus arbitration circuit (120), the PCMCIA interface configuration registers (130) and the clock control circuit (140). The interface and controller circuit (180) is connected to the oscillator circuit (181). The smart card includes at least two separate memories including, for example, the attribute memory (160) and the common memory (150). Both the common memory (150) and the attribute memory (160) are accessible, for example, by reading and writing, by the DSP (170) and the host computer (200). The DSP (170) accesses the common memory (150) by the program memory (and data memory for the C5X) of the DSP and accesses the attribute memory (160) through the I/O memory of the DSP.

The attribute memory (160) of the smart card (100) includes, for example, a minimum of 32 bytes and is expandable, for example, up to 128K bytes, for example, of contiguous memory. The attribute memory (160) includes additional bytes of memory for host computer (200) use. This additional memory is used for storing card configuration information, for example, I/O interrupt and I/O address and are physically located in the interface and controller circuit (180). The first 8 bytes of this additional memory provide memory for two card information structure tuples, and the last 4 bytes of the additional memory provide memory for the card configuration registers. These registers are, for example, located at even byte boundaries. Example 1 illustrates, for example, an attribute memory map.

| | |
|---|---|
| 0000000h | tuple code beginning of CIS |
| 0000002h | offset to next tuple |
| 0000004h | address of card configuration registers |
| 0000006h | " |
| 0000008h | " |
| 000000Ah | " |
| 000000Ch | tuple code |
| 000000Eh | tuple link |
| 0000010h | Configuration Option Register |
| 0000012h | Card Configuration and Status Register |
| 0000014h | Pin Replacement Register Organization |
| 0000016h | Socket and Copy Registers |

EXAMPLE 1

Examples of three card configurations are illustrated below in the next three examples (Examples 2-4). As in Example 2, the most significant bits (A19-A12) of the address used by the smart card to enable the host computer I/O access is stored in this register. The host computer (200) accesses this attribute memory address, for example, 80000. This first register is not accessible by the DSP.

EXAMPLE 2

The I/O configuration register number two is illustrated in Example 3.

EXAMPLE 3

For example, the least significant bits (A11-A7) of the address used by the smart card to enable the host computer I/O access are stored in this register. The host computer (200) accesses this register at the attribute memory address, for example, 80002. Again, this register is not accessible by the DSP.

Lastly, an I/O configuration register number three is illustrated in Example 4.

| 15 - 2 | 1 | 0 |
|---|---|---|
| Reserved | Reserved | MODE |

EXAMPLE 4

This register controls the interface of the smart card or the DSP/memory card by the host computer (200). The host computer (200) accesses this register at attribute memory address, for example, 800004. Again, this register is not accessible by the DSP. When the smart card (100) is switched from the smart mode to the standard mode, the mode bit is set, for example, to 1. When the smart card is switched from the standard mode to the smart mode the mode bit is set to 0. When the card is 'powered', the bit is set to 1 by default.

Figure 5:
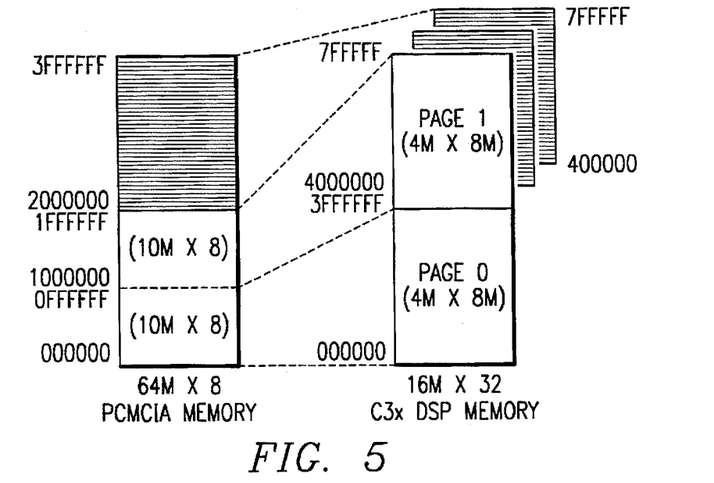
FIG. 5 illustrates a common memory map for a PCMCIA memory and a C3X DSP.
Figure 6:
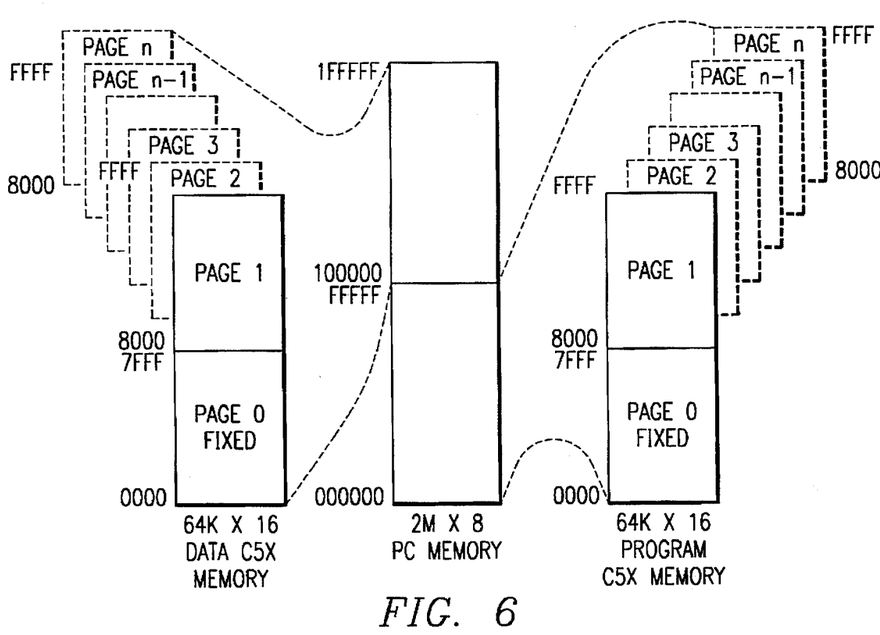
FIG. 6 illustrates the memory maps of the PCMCIA card, the data C5X DSP and the program CPX DSP memory.

Like with the attribute memory, the common memory is shared by the host computer (200) and the DSP (100). The size of the common memory is dependent upon the particular DSP used on the particular smart card. As illustrated in FIG. 5, the C3X DSP memory card, for example, includes 32M bytes of common memory. The memory is accessed by the DSP, in this case, by two pages of 4M×32 each. The memories could be expanded so that the DSP can address up to, for example, 256M bytes of memory of 16 pages of 4M×32 each. If, for example, a C5X DSP processor is used on the smart card, this C5X DSP can access up to a maximum of two megabytes of common memory, starting, for example, at address 0. Any additional memory provided on the card as common memory would only be accessible by the host computer. The C5X DSP accesses the memory in 32 pages of 32K×16 each. The 32 pages are divided as 16 pages of program memory and 16 pages of data memory. Exemplary for both the C3X DSP and the C5X DSP, two pages of memory could be active at any one time, and the C5X DSP could have two pages each of program memory and data memory active. Page zero, for example, is always active for both the C3X and the C5X DSPs. This condition allows the DSP operating system to employ page zero as the system memory, and any additional pages of memory are employed as application specific memory. When the system is powered up, pages zero and one are selected as default.

Modes

The smart card (200) operates in at least two modes, the standard mode and the smart mode. While the smart card (100) is in the standard mode, the DSP (170) is inactive, and this is the default mode of the smart card. While in the standard mode, the smart card appears to the host computer as a standard memory card. The size of the memory available on the smart card is specified by the Card Information Structure (CIS) in the attribute memory. The details of this mode is explained, for example, in PCMCIA standard 2.0, incorporated by reference herein in its entirety. The DSP (170) does not become activated until the host computer (200) activates the DSP (170).

While the smart card (100) is in the smart mode, the DSP (170) is active and executes instruction code from either the common memory (150) or the attribute memory (160). The first 2K bytes, for example, of common memory are remapped into physical locations in the interface and controller circuit (180). While in the smart mode, the DSP (170) communicates with the host computer (200) by a set of host communication registers. Thus, the host computer is able to access the communication registers in the shared memory and the operation of the DSP (170) continues since no bus arbitration is required while these registers are being accessed. The host computer (200) can parallel process while maintaining communication with the DSP (170). The host computer (200) may not access any other locations within this 2K byte block while the smart card (100) is in the smart mode since the result may be unpredictable.

The operating mode, for example, the smart mode or the standard mode of the smart card is controlled by the control, status and communication registers (110) of the interface and controller circuit (180). For example, the control of the smart card could be obtained through the use of eight registers. A portion of these registers are accessible only by the host computer (200). Another portion of these registers is accessible only by the DSP (170), and a further portion of these registers are accessible both by the host computer (200) and the DSP (170). The control status and communication registers (110) are mapped in the common memory of the host computer and the I/O memory of the DSP (170). In the standard mode, only the signature register is accessible to the host computer. The communication registers are dually mapped into the I/O port of the host computer (200) when the I/O is enabled.

These registers are mapped into the first 2K bytes, for example (000000h-0007FFh), of the host computer to ensure that the host computer (200) will not accidentally change interrupt vectors of the DSP (170) interrupting the DSP (170) while the card (100) is in the smart mode. While in the smart mode, the first 2K bytes of the host computer (200) is not available to the host computer for shared memory access. While the host computer accesses the communication, control and status registers (110), these registers will be accessed physically located in the interface and controller circuit (180) and not in common memory.

Example 5 illustrates, by example, the registers implemented in the interface and controller circuit (180).

| Register Name | Memory Address | | | Access | |
|---|---|---|---|---|---|
| | PC | C3X | C5X (I/O) | Default Value | PC | DSP |
| SIGR | 000400h | — | — | xxxx | R/W | — |
| DSPCR | 000002h | — | — | xxxx | R/W | — |
| DSPSR | 000004h | — | — | xxxx | R | |
| DSPTXD | 000006h | 800000h | 0050h | — | R | W |
| DSPRXD | 000008h | 800001h | 0051h | — | W | R |
| PCSR | — | 800002h | 0052h | xxxx | — | R |
| BIOR | — | 800003h | 0053h | xxxx | — | R/W |
| SYSCFG | — | 800004h | 0054h | xxxx | — | R/W |

EXAMPLE 5

While the smart card (100) is in the standard mode, only the signature register is defined or accessible, and the card logic of the interface and controller circuit (180) monitors signature register for writes from the host computer to this location for the valid signature pattern. While the smart card is operating in the smart mode, the signature register is not accessible to the host computer (100) and any write to the signature register is ignored. The DSP has no read or write access to the signature register.

The following bit configurations are described as an example of possible bit configurations. Other bit configurations could achieve the same results. The information placed in these registers could be alternatively placed in memory, avoiding the use of the register.

Example 6 illustrates the DSP Control Register (DSPCR).

| 15 - 6 | 5 | 4 | 3 | 2 | 1 | 0 |
|---|---|---|---|---|---|---|
| Reserved | CLKON | MODCTL | AINTEN | RXINTEN | TXINTEN | RESET |

EXAMPLE 6

This register is accessed, for example, by read and write, by the host computer (100). The DSPCR generates a reset and interrupt for the DSP and switches the card from a smart mode to a standard mode by the host computer. After the smart card (100) has been switched to the smart mode, the card logic of the interface and controller circuit (180) monitors any write to this register and generates control signals to be sent to the DSP in accordance with the change to the register. The host computer (100) has full read-write access to this exemplary 16-bit register. The definition of the individual bits of the DSPCR is as follows.

If the reset bit is a '1', DSP (170) is reset; this bit could be used to reset other circuits on the board. The host computer must set this bit to zero in order for the operation of the DSP to resume. The default value of this bit is zero.

The TXINTEN bit of the DSPCR is accessed by the host computer so that the host computer can receive an interrupt when the DSP (170) transmits or writes data to the data transmit register DSPTXD. While the TXINTEN bit is set to one, this bit is used in conjunction with the TXFULL bit of the DSP status register DSPSR to generate an interrupt to the host computer, allowing interrupt driven communications with the DSP. Initially, this TXINTEN bit is set to zero.

The RXINTEN bit allows the host computer to receive an interrupt while the DSP data receive register DSPRXD is read by the DSP (170). The TXEMPTY bit of the DSPCR is used in conjunction with the RXINTEN bit to generate an interrupt to the host computer (200), while allowing interrupt driven communications with the DSP (170). The default value of this bit is 0.

The AINTEN bit enables interrupts from the AFE cards to interrupt the host computer. The interrupt of the host computer is generated when the AINTEN bit is set to one. If the AINTEN bit is set to zero, the AFEINT bit in the DSPCR is cleared. The Interpret Service Routine (ISR) of the host computer reads the DSPSR to determine if the AFEINT bit has been set to one. If the AFEINT bit has been set to one, indicating a pending interrupt from the AFE card, the host computer sets the AINTEN bit in the DSPCR to zero to clear the current interrupt and set the AINTEN to one. The default value for the AINENT bit is zero.

The MODCTL bit is used to reset the smart mode of the smart card and forces the smart card to the standard mode while the MODCTR has been set to one. This MODCTL bit will be set to zero when the smart mode is entered through the host computer writing the signature or predetermined bit pattern to the signature register. The default value for the MODCTL bit is one.

The CLKON bit turns the DSP clock off through the clock control circuit (140), for example, for the C5X DSP, while the CLKON bit is set to zero. Additionally, when the CLKON bit is set to zero, the DSP generates a HOLD signal. After the HOLD signal is generated, the interrupt and control circuit (180) waits for the DSP to generate the HOLDA signal before the DSP clock is turned off. When the HOLDA signal is generated, the DSP is turned off by turning the DSP clock off. The operation of the CLKON bit lowers the operating power, for example, for the C5X DSP and permits the host computer to access the shared memory of the smart card, avoiding arbitration delay of the bus. If the CLKON bit is reset to one, the DSP clock is turned on again, activating the DSP (170). The default value for the CLKON bit is zero.

Another register of the control/status and communication register of the interface and controller circuit (180) is the DSPSR. The DSPSR is a 16-bit register, for example, in the interface and control circuit (180) and is available while the smart card (100) is in the smart mode. The control logic of the interface and controller circuit (180) writes to this register. The host computer accesses, for example, by reading the DSPSR in the shared memory space to determine the status of the DSPTXD and DSPRXD registers, the host computer interrupt generated by the DSP and the interrupt generated by the AFE card.

The DSPSR is illustrated in Example 7.

| 15 - 4 | 3 | 2 | 1 | 0 |
|---|---|---|---|---|
| Reserved | AFEINT | RXEMPTY | TXFULL | Reserved |

EXAMPLE 7

The TXFULL bit of the DSPSR is set to one while the DSP writes new data to the DSPTXD register. The TXFULL bit is set to zero when the host computer completes the read from the DSPTXD. Note, the DSP should only write to the DSPTXD when the TXEMPTY bit of the PC status register, PCSR is set to one. The TXFULL bit is set to zero at default.

The RXEMPTY is set to one, for example, after the DSP reads from the DSPRXD register. The RXEMPTY bit is set to zero when the host computer writes new data into the DSPRXD. The host computer only writes to the DSPRXD register while the RXEMPTY bit is zero. If the host computer writes to the DSPRXD while the RXEMPTY bit is set to zero, the previous data in the DSPRXD will be overwritten. The default value of the RXEMPTY bit is zero.

The AFEINT bit corresponds to the current condition of the AFE card interrupt signal. This signal is latched in the interface and controller circuit (180). Additionally, this signal is available to the DSP at the INT1-pin of the DSP. In order to minimize the power consumption of the smart card (100), the host computer may maintain the DSP at reset, for example, while in a smart mode, until an external event occurs, for example, a ring or a voice-activated switch. The host computer reads the AFEINT bit of the DSPCR to determine if the AFEINT bit has been set to one. If the AFEINT bit has been set to one, which indicates a pending interrupt from the AFE card, the host computer must a) first clear the AINTEN bit by setting the bit to 0 to clear the current interrupt, then b) re-enable the AINTEN bit after the interrupt has been serviced, again by setting the AINTEN bit to one, allowing subsequent AFE interrupts to be generated.

The DSP data transfer register, DSPTXD, for example, is a 16-bit register used by the DSP to communicate to the host computer with data. The host computer has only read access to the DSPTXD register, and if the host computer writes to the DSPTXD the write is ignored. In contrast, the DSP has only write access to the DSPTXD register, and if the DSP attempts to read from the DSPTXD, invalid data will be read. The DSPTXD is dually mapped into the I/O address of the host computer as specified by the Card Configuration Register (CCR) in the attribute memory and the host computer, for example, address 000006h. The DSPTXD is read by the host computer either at the memory address or the I/O memory address. As the DSP writes to the DSPTXD register, an interrupt corresponding to the TXFULL bit is generated to the host computer. In a similar fashion, if the host computer reads from the DSPTXD, an interrupt is generated corresponding to the TXEMPTY bit to the DSP.

The DSP data receive register, DSPRXD, is, for example, a 16-bit register used by the host computer to communicate to the DSP. The host computer has only write access to the DSPRXD register, and if the host computer attempts to read from this register, the host computer receives invalid data from the read. The DSP has only read access to the DSPRXD register, and if the DSP writes to the DSPRXD register, the write request is ignored. The DSPRXD is dually mapped into the I/O address memory of the host computer (200) as specified by the CCR in the attribute memory (160), and the memory address of the host computer, for example, PCMCIA memory address 000008h. Alternatively, the host computer may write to this register either in the memory address of the host computer or the appropriate I/O address. If the DSP reads from the DSPRXD, an interrupt to the host computer corresponding to RXEMPTY is enabled. In a similar fashion, if the host computer writes to the DSPRXD, an interrupt to the DSP is generated, corresponding to the RXFULL interrupt.

Although the transfer of data employs two registers, namely DSPTXD and DSPRXD, a single register or memory location could be employed.

As illustrated below in Example 8, the host computer status register PCSR is, for example, a 16-bit register in the interface and control circuit (180) and is accessed by the DSP in the I/O memory of the DSP to determine the status of the host communication registers.

| 15 - 2 | 1 | 0 |
|---|---|---|
| Reserved | RXFULL | TXEMPTY |

EXAMPLE 8

The TXEMPTY bit is set to one by the control logic of the interface and controller circuit (180) after the host computer reads new data from the DSPTXD. The TXEMPTY bit is set to zero when the DSP writes additional data to the DSPTXD, indicating new data is available for the host computer. The TXEMPTY bit directly drives the INT3-pin of the DSP for generating communication transmit interrupt to the DSP. The default value for the TXEMPTY is zero.

Another bit of PCSR is the RXFULL but, the RXFULL bit is set to one by the control logic of the interface and controller circuit (180) when the host computer writes new data to the DSPRXD register. The RXFULL bit is set to zero when the DSP completes the read from the DSPRXD register. The host computer should only write new data to the DSPRXD register when the RXEMPTY bit in the DSPSR register is zero. The RXFULL bit directly drives the INT2-pin of the DSP to generate a communication received interrupt to the DSP. The default value for the RXFULL bit is zero.

The AFE card is controlled by the Bit I/O Register as shown in Example 4. The Bit I/O Register (BIOR) is, for example, a 16-bit register, used for bit I/O to control the AFE card. Exemplary Bits 0–7 of the BIOR are input bits to monitor events, and Bits 15–8 of the BIOR are output bits. The DSP reads and writes from this register directly to control and to monitor external events. The default of the output bits are set to one and control the AFE card. The BIOR is illustrated in Example 9.

Host Communication

As described above, the DSP communicates to the host computer by the dedicated communication registers. These registers reside in the I/O memory of the DSP. For example, if a C3X DSP is employed, the address 800000 and higher are dedicated as I/O memory. Both the host computer and the DSP may use hardware interrupts or software polling for communication to the other device, respectively. The host computer enables the communication interrupts by setting the CINTEN bit to one for interruption. If the RXFULL bit or the TXEMPTY bit is set to one, an interrupt signal to the DSP is generated through INT3-pin of the DSP. These interrupts may be masked off if the DSP algorithm is not used. These interrupt signals remain valid until the DSP reads from the DSPRXD bit or writes to the DSPTXD

| 15 - 13 | 12 | 11 - 8 | 7 - 4 | 3 - 0 |
| --- | --- | --- | --- | --- |
| Reserved | —SPKR | O3 - O0 | Reserved | I3 - I0 |

EXAMPLE 9

The speaker bit, for example, is connected to the PCMCIA-speaker signal and is used to generate the digital audio signals. The default value is zero, for example, no audio.

Another register controls the frequency of the clock input to the DSP. The system configuration register is, for example, a 16-bit register and controls the frequency of the clock input to the DSP and the AFE card and to select the offset address of the current data and program memory page. (If a C3X DSP is used, for example, the system configuration register selects the program memory only.) The system configuration register is shown in Example 10.

register. By reading or writing to the data register, the appropriate interrupts to the DSP are cleared.

Interrupts

An interrupt to the host computer may be generated by two different sources on the card. The host computer determines the source of the interrupt by the DSPSR. The two sources of the interrupt to the host computer are:

1) the communication interrupt, when enabled by the host computer. The communication interrupted is generated when (a) it is enabled by the host computer, for example, the CINTEN bit is set to one and (b) the DSPTXD register is full, for example, the DSP has sent new data to the host computer or the DSPRXD register

| 15 - 12 | 11 - 8 | 7 - 3 | 2 | 1 | 0 |
| --- | --- | --- | --- | --- | --- |
| EXDP3-EXDP0 | EXPP3-EXPP0 | Reserved | CLKSEL | CLKD1 | CKLD0 |

EXAMPLE 10

The CLKSEL bit selects the DSP master dock source. While the CLKSEL bit is set to one, the clock input of the DSP is driven by the output of the dock divider output. While this bit is set to zero, the clock input of the DSP is the oscillator output. The clock divider select bits, for example, Bits CLKD3-CLKD0 selects a divisor for the output of the clock divider, for example, 2, 4, 8 or 16. For example, dividing the clock output by 16 is not valid for the C3X DSP. Thus, by using the bits of this register, various DSPs can be employed.

The EXPP3-EXPP0 bits or the external program memory page select bits 3-0, for example, enables the program memory pages 1-n as with the description of the memory. For example, the lowest page number is permitted is one, and page zero is fixed and not selectable by the user. Additionally, for example, the C3X-based cards of the DSP selects external memory pages using bits 0 and 1 only. The use of bits 2 and 3 are not permitted for CX3 due to the 64M byte limitation.

The EXDP3-EXDP0 external data page memory select bits 3-0 enable the memory pages 1-n as with the description of the memory. As with the external program memory page select bits, the lowest page allowed is one and page zero is fixed and not user selectable. These bits are reserved bits for the CX3 base cards DSP and are not used.

is empty, for example, if the DSP has read old data from the host computer; and 2) a second source of interrupt is the AFE card when enable by the host computer. The AFE interrupt is generated (a) when it is enabled by the host computer, for example, AINTEN is set to one and (b) the AFE card generates an interrupt, for example, INT1-pin to the DSP.

The sources of interrupt to the DSP are:

1) The DSP receives an interrupt, for example, through the INT2-pin, is generated when it is enabled by the DSP masking the INT2-pin of the DSP; and when the RXFULL bit in the PCSR is set, indicating that the DSPRXD register is full, for example, the host computer has written new data.

2) An additional source of interrupt to the DSP is the DSP transmit interrupt through the INT3-pin generated when it is enabled by the DSP masking the INT3-pin of the DSP and the TXEMPTY bit in the PCSR register is set to one indicating that the DSPTXD has been emptied, for example, the DSP has read the data); or, finally, 3) from the AFE card when enabled by the DSP (INT0 INT1) by proper interrupt signals as defined by the DSP in the user guide.

The communication between the DSP (170) and host communication can be done with software polling as illustrated below.

During a read by the host computer, the host computer reads the DSPSR register to verify that the DSP (170) has written new data into the DSPTXD register. The host computer waits until the TXFULL bit is set to one. The host computer reads data from the DSPTXD register, then the TXFULL bit in the DSPSR register is set to zero by the host computer and the TXEMPTY bit in the PCSR register is set to one.

During a host computer write, the host computer reads the DSPSR register to verify that the DSP (170) has read the previous data which is indicated by the RXEMPTY bit, and the host computer waits until the RXEMPTY bit is set to one. The control logic then writes the data into the DSPRXD register. The host computer clears the RXEMPTY bit in the DSPSR register and then the RXFULL bit in the PSCR register is set to one.

During a read of the DSP (170), the DSP (170) reads the PCSR to verify that the host computer has written new data into the DSPRXD. The DSP waits until the RXFULL bit is set to one. The DSP (170) reads the data from the DSPRXD register; the RXFULL bit of the PCSR is set to zero, and the RXEMPTY bit in the DSPSR register is set to one. During a DSP (170) write, the DSP reads the PCSR to verify that the host computer has read the previous data, as indicated by the TXEMPTY bit. The DSP (126) waits until the TXEMPTY bit is set to one, then the DSP writes the data into the DSPTXD register. The TXEMPTY bit of the PSCR is set to zero, and the TXFULL bit in the DSPSR is set to one.

Since both the DSP and the host computer access the shared memory on the smart card, bus arbitration is necessary. The host computer always has the higher priority for accessing the shared memory on a card (however, in another embodiment, the DSP could be given the higher priority). If the host computer attempts to access the shared memory, the operation of the DSP is halted. However, since the communication control and control registers are not resident in the shared memory, but in fact are resident in the interface and control circuit (180), access, write or read to these registers by the host computer does not halt the operation of the DSP. The arbitration logic of the PC/DSP bus arbitration circuit (120) generates the HOLD signal to be transmitted to the DSP and extends the memory access of the cycle of the host computer by generating the WAIT signal. Once the DSP acknowledges the HOLD signal by generating the HOLDA signal, tri-stating the bus, the wait of the host computer is ended and access to the shared memory is complete. When the host computer completes the access to the shared memory, the control of the shared memory is returned to the DSP.

If the CLKON bit is set to zero, the DSP (120) is placed in a hold state, forcing the buses of the DSP (170) to be tri-stated and allowing the host computer to have free access to the common memory (150).

The first kilobytes of the shared memory the host computer cannot access while the card is in the first mode.

While in the smart mode, the host computer cannot access, by reading and writing, the first 2K bytes of the shared memory. Thus, these first two kilobytes of memory could be used as protected memory for the DSP. However, if the host computer accesses this protected block, the DSP is not put into a hold state. The host computer must load the reset and interrupt vectors of the DSP and the application program prior to switching the card into the smart mode. Since the host computer can access the entire memory on the card without consideration of the page sizes of the DSP (170), the memory pages not used by the DSP can be dedicated exclusively for use by the host computer.

An algorithm is executed in the following manner. If only a single algorithm is to be executed and loaded, the host computer loads the desired algorithm to the memory of the DSP (170) and initializes the DSP (170). Next, the host computer enables the AFEINT by setting the AINTEN bit allowing the host computer to be interrupted by the AFE card, for example, by the voice activated switch or the ring detect. The host computer now may reduce power consumption of the system and turn off the clock of the DSP by setting the CLKON bit to zero. The DSP (170) is placed into a hold mode and tri-stating the buses of the DSP, allowing the host computer to have quicker access to the remaining unused portion on the card (100). When the desired or expected external event occurs as indicated by the AFEINT, the host computer turns the clock of the DSP on and the DSP (170) begins executing the algorithm. Since the algorithm is already located into the memory of the DSP (170), the computer does not delay in executing the algorithm since the algorithm is already loaded.

Further, multiple algorithms may be loaded and executed by DSP (170). The host computer initializes the DSP (170) and loads the operating system of the DSP. The operating system of the DSP loads various algorithms of the DSP into the various pages, for example, page one includes the first algorithm, and page two includes the second algorithm. The DSP (170) and host computer follows a pre-determined handshake protocol as set forth in the software examples. The commands and data may be exchanged easily between the host computer and the DSP (170) by using the communication registers as described hereinabove without halting the operation of the DSP. The operating system of the DSP controls the enabling the program/data of the DSP and the trans-mission of processed data by the DSP to the host computer. The following example is a list of the AFE interface connector-pin descriptions. See Example 10.

The software interface between the host computer and the DSP is as follows. As the smart card is powered up, the DSP is deactivated. Then the host computer is allowed to read/write the entire memory on the smart card. When the host computer switches the card from the standard mode to the smart mode, it performs the following functions. First, the host computer downloads the task to the shared memory. Note that the host computer will have to download the reset interrupt vectors starting at location zero. The host computer writes the signature pattern, for example, four times to the signature register. As the writing of signature pattern is seen four times by the control logic in the interface and controller circuit (180), the mode bit is set and the DSP is activated with start executing from the reset vector located in the shared memory. Example 11 illustrates a task control buffer used as handshake between application softwares in the host computer and the DSP.

Task Control Buffer (TCB):

The TCB is only a software concept used as a handshake between application softwares in the host computer and DSP. The TCB consists of 20 memory locations (20×32 or 20×16 depending on the DSP used). This buffer is located in the common memory and is fully relocatable.

The 20 locations are defined as follows:

| 1 | Status | —— address TCB start |
|---|---|---|
| 2 | Command | —— address TCB start+1 |
| 3 | Return Code | —— address TCB start+2 |
| 4 | Acknowledge | —— address TCB start+3 |
| 5 | parm00 | —— address TCB start+4 |
| 6 | parm01 | —— address TCB start+5 |
| 7 | parm02 | —— address TCB start+6 |
| 8 | parm03 | —— address TCB start+7 |
| 9 | parm04 | —— address TCB start+8 |
| 10 | parm05 | —— address TCB start+9 |
| 11 | parm06 | —— address TCB start+10 |
| 12 | parm07 | —— address TCB start+11 |

-continued

| 13 | parm08 | --- address TCB start+12 |
| 14 | parm09 | --- address TCB start+13 |
| 15 | parm10 | --- address TCB start+14 |
| 16 | parm11 | --- address TCB start+15 |
| 17 | parm12 | --- address TCB start+16 |
| 18 | parm13 | --- address TCB start+17 |
| 19 | parm14 | --- address TCB start+18 |
| 20 | parm15 | --- address TCB start+19 |

An explanation of the 20 words follows:

| | |
|---|---|
| STATUS: | this is a word in memory that contains the STATUS information pertaining to the current task. For example, a particular pattern will imply that the DSP is executing a specific task whereas another pattern will imply that the DSP is idling. |
| COMMAND: | this word contains an integer value or id of the specific command that should be executed by the DSP. |
| RETURN CODE: | this word contains the value returned by the DSP after executing a command. |
| ACKNOW-LEDGE: | this word serves to SYNCHRONIZE the two processors. The host computer issues a specific command to the DSP and WAITS for this location to have a particular pattern (e.g., 01040h) before proceeding further. Likewise, the DSP can also poll this location for a specific pattern before proceeding further. |
| PARM00 to PARM15: | these 16 locations serve as parameter passing area between the DSP and the Host. |

An example handshake between the PC and the DSP is shown in Table 1.

| Host-Side | DSP-Side |
|---|---|
| Write command-id to command in TCB. | Idling to executing some task. |
| Generate an Interrupt. | Enter ISR. |
| Poll for acknowledge pattern (1040h). | DSP Decodes command to execute. Writes acknowledge pattern (1040h) to ACKNOWLEDGE in TCB. Poll ACKNOWLEDGE for 0000h pattern. |
| Write 0000h pattern. Proceed further. | Proceed further after seeing 0000h. |

This TCB serves as pre-defined memory locations for communication between the PC and the DSP.

EXAMPLE 11

The operation of the communication registers are as follows. If a communication, for example, data, is desired to be sent from the host computer to the DSP (170), the DSPRXD register is employed. The RXEMPTY is set to zero by the control logic of the interface and controller circuit (180) and RXFULL is set to one by the control logic of the interface and controller circuit (180) as the host computer writes the data to DSPRXD register. However, after the DSP has read the DSPRXD register, the interface and controller circuit (180) card set the RXEMPTY bit to one and control logic of the interface and controller circuit (180) sets the RXFULL bit to zero. Additionally, the RXINTEN bit is set to one by the host computer so the host computer receives an interrupt when the DSP has completed the read. After the host computer has received the interrupt, the host computer clears the bit RXINTEN bit to zero. Likewise, the DSP (170) communicates with the host computer through the DSPTXD register. While the new data is being written to DSPTXN register, TXEMPTY bit is set to zero by the control logic of the interface and controller circuit (180) and additionally, when the data is written to DSPTXD the TXFULL bit is set to one by the control logic of the interface and controller circuit (180). The host computer sets the TXINTEN bit to one when the DSPTXD register is written to by the DSP so that an interrupt is generated after the write to the DSPTXD register is complete. The host computer sets TXINTEN to zero following interrupt. After the host computer has read the data from the DSPTXD register, two events occur. Namely, control logic of the interface and controller circuit (180) sets the TXFULL bit to zero and control logic of the interface and controller circuit (180) sets the TXEMPTY bit to one.

The host computer sets the AINTEN bit to one to enable interrupts from the AFE cards to interrupt the host computer. If an interrupt is expected from the AFE card, the AINTEN bit should be first set to zero to clear the current interrupt in the host computer and to enable an additional interrupt by setting the AINTEN bit to one. The pending interrupt is indicated to the host computer by the AFEINT bit being set to one by the control logic of the interface and controller circuit (180).

If the bus requires arbitration, the CLKON bit is set to zero by the host computer. The HOLD signal is generated by the interface and controller circuit (180). The interface and controller circuit (180) waits for the HOLDA signal. Once the HOLDA signal is received from the DSP, the DSP clock is shut off. The DSP remains shut off until the host computer sets the CLKON bit to one which turns the DSP clock on again.

Figure 4:
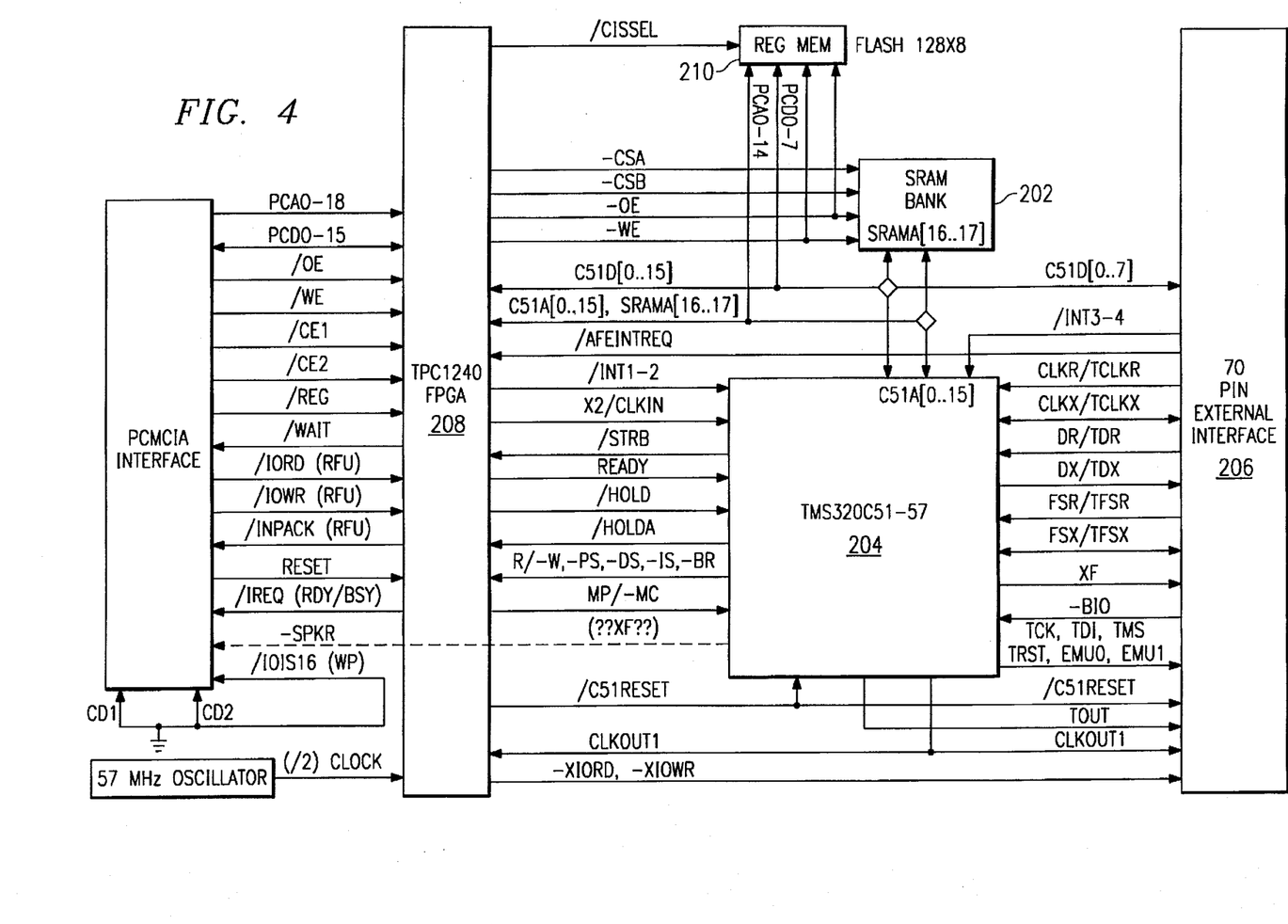
FIG. 4 shows one specific embodiment of the present invention.

FIG. 4 illustrates another employment of the present invention. As illustrated, a TMS320C51-57 circuit (201) is the DSP; the SRAM Board circuit (202) is the attribute memory; the Reg Memory (210) is the common memory; the 48-pin external interface circuit (206) is the AFE port; and the TPC1240 FPGA circuit (208) is the interface and controller circuit (180). The signal between the above circuits is described as follows in Example 12.

TMS320C51 PCMCIA DSP/MEMORY CARD
48 PIN AFE INTERFACE

| PIN # | I/O | SIGNAL | FUNCTION |
|---|---|---|---|
| 1 | | VCC | |
| 2 | | GND | |
| | | | DSP Serial Port Signals |
| 3 | I/O/Z | CLKR | TMS320C51 SERIAL PORT RECEIVE CLK |
| 4 | I/O/Z | CLKX | TMS320C51 SERIAL PORT TRANSMIT CLK |
| 5 | I | DR | TMS320C51 SERIAL PORT RECEIVE DATA |
| 6 | O/Z | DX | TMS320C51 SERIAL PORT TRANSMIT DATA |

|  |  |  |  |
|---|---|---|---|
| 7 | I/Z | FSR | TMS320C51 SERIAL PORT RECEIVE FRAME SYNCH PULSE |
| 8 | I/O/Z | FSX | TMS320C51 SERIAL PORT TRANSMIT FRAME SYNCH PULSE |
| 9 |  | GND |  |

DSP Clock/Bit I/O/Interrupt Signals

|  |  |  |  |
|---|---|---|---|
| 10 | O/Z | TOUT | TMS320C51 Timer Output Pulse |
| 11 | O/Z | XF | TMS320 EXTERNAL Flag |
| 12 | I | -BIO | Branch Control Input |
| 13 | I | -AFEINTREQ/ | ANALOG FRONT END INTERRUPT REQUEST |
|  | I | -INT4 | TMS320C51 EXTERNAL USER INTERRUPT 4 |
| 14 | I | -INT3 | TMS320C51 EXTERNAL USER INTERRUPT 3 |
| 15 | O/Z | CLKOUT1 | TMS320C51 EXTERNAL CLOCK |
| 16 |  | GND |  |

Bit I/O

|  |  |  |  |
|---|---|---|---|
| 17 | I/Z | I0 | Input Bit 0 |
| 18 | I/Z | I2 | Input Bit 1 |
| 19 | O/Z | O0 | Output Bit 0 |
| 20 | O/Z | O2 | Output Bit 2 |
| 21 | O/Z | O4 | Output Bit 4 |
| 22 | O/Z | O6 | Output Bit 6 |
| 23 |  | GND |  |
| 24 |  | VCC |  |
| 25 |  | VCC |  |
| 26 |  | GND |  |

DSP Serial/TDM Port Signals

|  |  |  |  |
|---|---|---|---|
| 27 | I/O/Z | TCLKR | TMS320C51 SERIAL PORT RECEIVE CLK |
| 28 | I/O/Z | TCLKX | TMS320C51 SERIAL PORT TRANSMIT CLK |
| 29 | I/Z | TDR | TMS320C51 SERIAL PORT RECEIVE DATA |
| 30 | O/Z | TDX | TMS320C51 SERIAL PORT TRANSMIT DATA |
| 31 | I/O/Z | TFSR/TADD | TMS320C51 SERIAL PORT RECEIVE FRAME SYNCH PULSE |
| 32 | I/O/Z | TFSX/TFRM | TMS320C51 SERIAL PORT TRANSMIT FRAME SYNCH PULSE |
| 33 |  | GND |  |

DSP Emulator Signals

|  |  |  |  |
|---|---|---|---|
| 34 | O/Z | TDO | TMS320C51 JTAG Test Data Output |
| 35 | I | TDI | TMS320C51 JTAG Test Data Input |
| 36 | I | TCK | TMS320C51 JTAG Test Clock |
| 37 | I | TRST | TMS320C51 JTAG Test Reset |
| 38 | I | TMS | TMS320C51 JTAG Test Mode Select |
| 39 | I/O/Z | EMU1/-OFF | TMS320C51 JTAG Emulator Pin 1 |
| 40 |  | GND |  |

Bit I/O

|  |  |  |  |
|---|---|---|---|
| 41 | I/Z | I1 | Input Bit 1 |
| 42 | I/Z | I3 | Input Bit 3 |
| 43 | O/Z | O1 | Output Bit 1 |
| 44 | O/Z | O3 | Output Bit 3 |
| 45 | O/Z | O5 | Output Bit 5 |
| 46 | O/Z | O7 | Output Bit 7 |
| 47 |  | GND |  |
| 48 |  | VCC |  |

FPGA I/O PINS LIST

| # PINS | I/O | SIGNAL | FUNCTION |
|---|---|---|---|

PCMCIA Signals

| # PINS | I/O | SIGNAL | FUNCTION |
|---|---|---|---|
| 16 | I/O/Z | D0–D15 | PCMCIA DATA LINES |
| 26 | I | A0–A25 | PCMCIA ADDRESS LINES |
| 1 | I | /CE1 | PCMCIA CARD ENABLE |
| 1 | I | /CE2 | PCMCIA CARD ENABLE |
| 1 | I | /REG | PCMCIA REGISTER SELECT AND I/O ENABLE |
| 1 | I | /OE | PCMCIA OUTPUT ENABLE |
| 1 | I | /WE | PCMCIA WRITE ENABLE |
| 1 | I | /IORD | PCMCIA I/O READ |
| 1 | I | /IOWR | PCMCIA I/O WRITE |
| 1 | I | RESET | PCMCIA CARD RESET |

-continued

| | | | |
|---|---|---|---|
| 1 | O/Z | /WAIT | PCMCIA EXTEND BUS CYCLE SIGNAL |
| 1 | O/Z | /INPACK | PCMCIA INPUT PORT ACKNOWLEDGE |
| 1 | O/Z | /IOIS16 | PCMCIA I/O PORT IS 16 BITS |
| 1 | O/Z | /IREQ | PCMCIA INTERRUPT REQUEST |
| 2 | O | /CD1/2 | Card detect |
| 1 | I | RFSH | Refresh |
| 1 | O | /SPKR | Speaker |
| 1 | O | STSCHG | Status Change |
| 54 | | Subtotal (Pins above in parentheses are not counted) | |
| | | | SRAM Signals |
| 2 | O/Z | -CS | CHIP SELECTS (RAMA&RAMB) |
| 1 | O/Z | -WE | WRITE ENABLE |
| 1 | O/Z | -OE | OUTPUT ENABLE |
| 4 | O/Z | SRAMA[16..19] | SRAM ADDRESS FOR PAGING |
| 62 | | Subtotal | |
| | | | TMS320C51 Signals |
| 1 | O/Z | X2/CLKIN | TMS320C51 CLKIN SIGNAL |
| 1 | I | CLKOUT1 | TMS320C51 CLKOUT1 |
| 1 | O/Z | /HOLD | TMS320C51 HOLD SIGNAL |
| 1 | I | /HOLDA | TMS320C51 HOLD ACKNOWLEDGE SIGNAL |
| 1 | O/Z | READY | TMS320C51 READY SIGNAL |
| 1 | I | /STRB | TMS320C51 EXTERNAL ACCESS STROBE |
| 1 | I | R/-W | TMS320C51 READ/WRITE SIGNAL |
| 1 | I | -RD | TMS320C51 -RD STROBE |
| 1 | I | -WE | TMS320C51 -WE STROBE |
| 1 | I | -PS | Program Space Strobe |
| 1 | I | -DS | Data Space Strobe |
| 1 | I | -IS | I/O Space Strobe |
| 1 | I | -BR | Global Data Strobe |
| 1 | O/Z | /C51RESET | TMS320C51 RESET |
| 1 | O/Z | /CPXEINT | COMMUNICATIONS PORT TRANSMIT BUFFER EMPTY INTERRUPT (INT1) |
| 1 | O/Z | /CPRFINT | COMMUNICATIONS PORT RECEIVE BUFFER FULL INTERRUPT (INT2) |
| 78 | | Subtotal | |
| 16 | I/O/Z | C51D0-15 | RAM/C51 DATA BUS LINES |
| 16 | I | C51A0-15 | TMS320C51 ADDRESS LINES |
| 110 | | Subtotal | |
| | | | External Interface |
| 1 | I | /AFEINTREQ | EXTERNAL PERIPHERAL INTERRUPT |
| 4 | I | I0-3 | Bit INPUT PORT |
| 8 | O/Z | O0-7 | Bit OUTPUT PORT |
| 123 | | Subtotal | |
| | | | Attribute Memory Chip Select |
| 1 | O/Z | /CISSEL | CARD INFORMATION STRUCTURE CHIP SELECT |
| | | | System Clock Signal |
| 1 | I | CLOCK | SYSTEM CLOCK INPUT |
| 125 | | Subtotal | |
| | | (Max on TPC1280 is 127) | |
| | | | POWER AND GROUND |
| 19 | | GND | |
| 13 | | VCC | |
| 157 | | PINS | |

An AFA interface Connector Pin Description is shown in Example 13.

| Appendix 1. AFE Interface Connector Pin Description | | | |
|---|---|---|---|
| 1 | H1/ | O | DSP system clock (C5X) |
| | CLKOUT | O | DSP system clock (C5X) |
| 2 | IS | O/Z | I/O STROBE (>800000h C3X) |
| 3 | RD_ | O/Z | READ SELECT |
| 4 | WE_ | O/Z | WRITE ENABLE |

-continued

Appendix 1. AFE Interface Connector Pin Description

| | | | |
|---|---|---|---|
| 5 | A0 | O/Z | ADDRESS BIT 0 |
| 6 | A1 | O/Z | ADDRESS BIT 1 |
| 7 | A2 | O/Z | ADDRESS BIT 2 |
| 8 | A3 | O/Z | ADDRESS BIT 3 |
| 9 | D0 | I/O/Z | DATA BIT 0 |
| 10 | D1 | I/O/Z | DATA BIT 1 |
| 11 | D2 | I/O/Z | DATA BIT 2 |
| 12 | D3 | I/O/Z | DATA BIT 3 |
| 13 | D4 | I/O/Z | DATA BIT 4 |
| 14 | D5 | I/O/Z | DATA BIT 5 |
| 15 | D6 | I/O/Z | DATA BIT 6 |
| 16 | D7 | I/O/Z | DATA BIT 7 |
| 17 | D8 | I/O/Z | DATA BIT 8 |
| 18 | D9 | I/O/Z | DATA BIT 9 |
| 19 | D10 | I/O/Z | DATA BIT 10 |
| 20 | D11 | I/O/Z | DATA BIT 11 |
| 21 | D12 | I/O/Z | DATA BIT 12 |
| 22 | D13 | I/O/Z | DATA BIT 13 |
| 23 | D14 | I/O/Z | DATA BIT 14 |
| 24 | D15 | I/O/Z | DATA BIT 15 |
| 25 | CLKR | I/O/Z | SERIAL PORT RCV CLOCK (C5X:INPUT ONLY) |
| 26 | CLKX | I/O/Z | SERIAL PORT TX CLOCK |
| 27 | DR | I | SERIAL PORT RCV DATA INPUT |
| 28 | DX | O/Z | SERIAL PORT TX DATA OUTPUT |
| 29 | FSR | I/O/Z | SERIAL PORT RCV FRAME SYNCH (C5:INPUT ONLY) |
| 30 | FSX | I/OZ | SERIAL PORT TX FRAME SYNCH |
| 31 | TCLKR | I | TDM SERIAL PORT RCV CLOCK (C5X) |
| 32 | TCLKX | I/O/Z | TDM SERIAL PORT TX CLOCK (C5X) |
| 33 | TDR | I | TDM SERIAL PORT RCV DATA INPUT (C5X) |
| 34 | TDX | O/Z | TDM SERIAL PORT TX DATA OUTPUT (C5X ONLY) |
| 35 | TFSR | I/O/Z | TDM PORT RCV FRAME SYNCH (C5X) |
| 36 | TFSX | I/O/Z | TDM PORT TX FRAME SYNCH (C5X) |
| 37 | EMU3/ TDO | O/Z | EMU3: EMULATION PIN 3 (C3X) TDO: JTAG TEST DATA OUTPUT (C5X) |
| 38 | EMU0/ TDI | I | EMU0 (C31): EMULATION PIN 0 TDI (C5X): JTAG TEST DATA INPUT |
| 39 | EMU1/ TMS | I | EMU1 (C31): EMULATION PIN 1 TMS (C5X): JTAG TEST MODE SELECT |
| 40 | EMU2/ TRST | I | EMU2 (C31): EMULATION PIN 2 TRST (C5X): JTAG TEST RESET |
| 41 | H3/ TCK | I/O | H3 (C31): TMS320C31 H3 CLOCK TCK (C5X): JTAG TEST CLOCK |
| 42 | TCK-RET | I | TCK-RET (C5X): TEST CLOCK RETURN |
| 43 | — EMU0 | NC I/O/Z | — (C31): NO CONNECTION EMU0 (C5X): EMULATOR PIN 0 |
| 44 | — EMU1 | NC I/O/Z | — (C31): NO CONNECTION EMU1 (C5X): EMULATOR PIN 1 |
| 45 | I0 | I | Buffered input bit to the DSP |
| 46 | I1 | I | Buffered input bit to the DSP |
| 47 | I2 | I | Buffered input bit to the DSP |
| 48 | I3 | I | Buffered input bit to the DSP |
| 49 | O0 | O | Buffered output pin programmable by DSP |
| 50 | O1 | O | Buffered output pin programmable by DSP |
| 51 | O2 | O | Buffered output pin programmable by DSP |
| 52 | O3 | O | Buffered output pin programmable by DSP |
| 53 | XF1 | O | Output driven by DSP |
| | — | NC | No connection for C5X |
| 54 | XF | O | DSP XF output pin |
| 54 | BIO | I | Direct input to DSP BIO pin |
| 55 | INT0 | I/O | DSP interrupt 0 input |
| 56 | INT1 | I/O | DSP interrupt 1 input |
| 57 | | | |
| 58 | | | |
| 59 | | | |
| 60 | | | |
| 61 | | | |
| 62 | | | |
| 63 | | | |
| 64 | VCC | | |
| 65 | VCC | | |
| 66 | GND | | |
| 67 | GND | | |
| 68 | KEY | NC | |

The DSP memory card could be used as a board level prototype for the System for Advance Bandwidth Requirement (SABRE). These cards can be used as standard memory or as a multi-function peripheral card. The DSP memory card could interface to the host computer a PCM-CIA memory or I/O mapped peripheral. The attribute memory could be one byte addressable memory, the common memory in byte mode (8 bits), a word mode (16 bits), or any other bit size. Additionally, the DSP or host computer could address the above-described 16-bit register. However, the present invention could be used with other bit register size. Additionally, the DSP can address the memory as 32 or 16-bit cards or any other size bit cards in accordance with the bit size available. The attribute memory and all control and status register could be independent in a separate FPGA/AS IC device.

Other Embodiments

Although the present invention and its advantages have been described in detail, it should be understood that various changes, substitutions and alterations can be made herein without departing from the spirit and scope of the invention as defined by the appended claims.

What is claimed is:

1. A system for improved processing, comprising:

a memory device, said memory device comprising, a memory for storing data and instructions at a plurality of memory locations;

process logic integrated with said memory within a single integrated circuit for processing said data in response to said instructions;

an external interface including a communication circuit coupled to said single integrated circuit so that said memory locations are directly accessible through said external interface by a first external device to said single integrated circuit; and said first external device being coupled to said external interface for directly accessing without bus arbitration said memory locations, said communication circuit being coupled to said external device so that said process logic can communicate with said external device, wherein said external device controls an operating speed of the process logic.

2. A method of improved processing, comprising the steps of:

storing data and instructions at a plurality of memory locations of a memory;

processing said data in response to said instructions using process logic integrated with said memory within a single integrated circuit;

directly accessing without bus arbitration said memory locations from a first external device coupled to said single integrated circuit through an external interface; and communicating between said process logic and said external device as said data is processed, wherein said method further includes a step of controlling an operation speed of the process logic by said external interface.

3. A system for improved processing, comprising:

a memory device, said memory device including a memory for storing data and instructions at a plurality of memory locations;

process logic integrated with said memory within a single integrated circuit for processing said data in response to said instructions;

an external interface for said single integrated circuit so that said memory locations are directly accessible through said external interface by a first external device not positioned on said single integrated circuit; and said first external device being coupled to said external interface for directly accessing without bus arbitration said memory locations, said external interface controlling an operating speed of said process logic.

4. A system for improved processing, comprising:

a memory device, said memory device comprising, a memory for storing data and instructions at a plurality of memory locations;

process logic integrated with said memory within a single integrated circuit for processing said data in response to said instructions, said single integrated circuit being positioned on a detachable card;

an external interface coupled to said single integrated circuit so that said memory locations are directly accessible through said external interface by a first external device to said single integrated circuit; and said first external device being coupled to said external interface and not positioned on said single integrated circuit and not positioned on said detachable card for directly accessing without bus arbitration said memory locations, said external interface controlling the operating speed of said process logic.

* * * * *